United States Patent
Chuang et al.

(10) Patent No.: US 9,749,628 B2
(45) Date of Patent: Aug. 29, 2017

(54) METHODS OF HANDLING ESCAPE PIXEL AS A PREDICTOR IN INDEX MAP CODING

(71) Applicant: HFI Innovation Inc., Zhubei, Hsinchu County (TW)

(72) Inventors: Tzu-Der Chuang, Zhubei (TW); Yu-Chen Sun, Keelung (TW); Jungsun Kim, San Jose, CA (US); Shan Liu, San Jose, CA (US); Wang-Lin Lai, San Jose, CA (US); Yi-Wen Chen, Taichung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/321,769

(22) PCT Filed: Jul. 7, 2015

(86) PCT No.: PCT/CN2015/083442
§ 371 (c)(1),
(2) Date: Dec. 23, 2016

(87) PCT Pub. No.: WO2016/004849
PCT Pub. Date: Jan. 14, 2016

(65) Prior Publication Data
US 2017/0134725 A1 May 11, 2017

Related U.S. Application Data

(60) Provisional application No. 62/021,289, filed on Jul. 7, 2014, provisional application No. 62/027,334, filed
(Continued)

(51) Int. Cl.
*H04N 19/105* (2014.01)
*H04N 19/11* (2014.01)
(Continued)

(52) U.S. Cl.
CPC ............ *H04N 19/105* (2014.11); *H04N 19/11* (2014.11); *H04N 19/182* (2014.11); *H04N 19/184* (2014.11)

(58) Field of Classification Search
CPC ..................................................... H04N 19/105
See application file for complete search history.

(56) References Cited

U.S. PATENT DOCUMENTS 8,379,044 B2 2/2013 Yang et al.
2005/0276489 A1 12/2005 Ishikawa

FOREIGN PATENT DOCUMENTS

| CN | 1716998 | 1/2006 |
| CN | 101065779 | 10/2007 |
| WO | WO 00/41394 | 7/2000 |

OTHER PUBLICATIONS

Guo, Liwei; RCE3: Results of Test 3.1 on Palette Mode for Screen Content Coding, Joint Collaborative Team on Video Coding (JCT-VC) of ITU-T SG 16 WP 3 and ISO/IEC JTC 1/SC 29/WG 11, 14th Meeting: Vienna, AT, Jul. 25, 2013-Aug. 2, 2013, Document: JCTVC-N0247 Aug. 2, 2013 (Aug. 2, 2013).*

(Continued)

*Primary Examiner* — Andy Rao
*Assistant Examiner* — Tyler Edwards
(74) *Attorney, Agent, or Firm* — McClure, Qualey & Rodack, LLP

(57) ABSTRACT

Methods to overcome issues associated with predictors being an Escape pixel in palette coding using a copy mode are disclosed. According to one embodiment, if the predictor for a copy-above mode is an Escape pixel, the pixel value of the current Escape pixel is transmitted so that it can be reconstructed using the transmitted pixel value. In another embodiment, restriction is applied to the encoder side, where in the copy-above mode, the copy-above run is terminated or the copy-above mode is not selected for the current pixel (Continued)

whenever an above pixel located above a current pixel is an Escape pixel. In yet another embodiment, directly copying the Escape value is used, where both the Escape index and Escape value, or the reconstructed pixel value of the predictor is directly copied to reconstruct a current pixel when the predictor is an Escape pixel.

15 Claims, 2 Drawing Sheets

Related U.S. Application Data on Jul. 22, 2014, provisional application No. 62/030,714, filed on Jul. 30, 2014, provisional application No. 62/035,625, filed on Aug. 11, 2014, provisional application No. 62/040,020, filed on Aug. 21, 2014, provisional application No. 62/040,022, filed on Aug. 21, 2014.

(51) Int. Cl.
    *H04N 19/182* (2014.01)
    *H04N 19/184* (2014.01)

(56) References Cited

OTHER PUBLICATIONS

International Search Report dated Sep. 25, 2015, issued in application No. PCT/CN2015/083442.
Guo, L., et al.; "RCE3: Results of Test 11 on Palette Mode for Screen Content Coding;" Joint Collaborative Team on Video Coding (JCT-VC) of ITU-T SG 16 WP 3 and ISO/IEC JTC 1/SC 291WG 11, 14th Meeting: Vienna, AT; Jul. 25-Aug. 2013; pp. 1-7.
Guo, L., et al.; "Evaluation of Palette Mode Coding on HM-12.0+RExt-4.1;" Joint Collaborative Team on Video Coding (JCT-VC) of ITU-T SG 16 WP 3 and ISO/IEC JTC 1/SC 29/WG 11, 15th Meeting: Geneva, CH; Oct.-Nov. 2013; pp. 1-7.

\* cited by examiner

METHODS OF HANDLING ESCAPE PIXEL AS A PREDICTOR IN INDEX MAP CODING

CROSS REFERENCE TO RELATED APPLICATIONS

The present invention claims priority to U.S. Provisional Patent Application, Ser. No. 62/021,289, filed on Jul. 7, 2014, U.S. Provisional Patent Application, Ser. No. 62/027,334, filed on Jul. 22, 2014, U.S. Provisional Patent Application, Ser. No. 62/030,714, filed on Jul. 30, 2014, U.S. Provisional Patent Application, Ser. No. 62/035,625, filed on Aug. 11, 2014, U.S. Provisional Patent Application, Ser. No. 62/040,020, filed on August 21 and U.S. Provisional Patent Application, Ser. No. 62/040,022, filed on Aug. 21, 2014. The U.S. Provisional Patent Applications are hereby incorporated by reference in their entireties.

TECHNICAL FIELD

The present invention relates to palette coding for video data. In particular, the present invention relates to various techniques to resolve the issues associated with predictor copy modes when a predictor corresponds to an Escape pixel.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed. These tools related to the present invention are briefly reviewed as follow.

Palette Coding

During the development of HEVC screen content coding (SCC), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "*Evaluation of Palette Mode Coding on HM-12.0+RExt-4.1*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table (also called palette table) size is first transmitted followed by the palette elements (i.e., color values).

2. Transmission of pixel values: the pixels in the CU are encoded in a raster scan order. For each group of one or more pixels, a flag for a run-based mode is first transmitted to indicate whether the "copy-index mode" or "copy-above mode" is being used.

2.1 "Copy-index mode": In this run-based mode, a palette index is first signaled followed by a value "palette_run" (e.g., M) representing the run value. The "copy-index mode" is also referred as "index" mode in some literature. The term "palette_run" may also be referred as "pixel_run" or simply "run" in this disclosure. The run value indicates that a total of M consecutive samples are all coded using run mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.

2.2 "Copy-above mode": In the copy-above mode, a value "palette_run" (e.g. N) is transmitted to indicate that for the current pixel and the following N pixels, the palette index is the same as the corresponding palette index in the row above.

3. Transmission of residue: the palette indices transmitted in Stage 2 are converted back to pixel values and used as the prediction. Residue information is transmitted using HEVC residual coding and is added to the prediction for the reconstruction.

Both the copy-index mode and copy-above mode are referred as "copy modes" in this disclosure. In the copy-index mode, the palette index of the leading pixel of the copy-index coded pixels is transmitted. The number of the copy-index coded pixels is also transmitted. At the decoder side, after determining the coding mode (i.e., copy-index mode) for the underlying pixels, only the information of the palette index of the leading pixel and the number of the copy-index coded pixels are needed to reconstruct the copy-index coded pixels. The pixels following the leading pixel can be reconstructed by "copying" from the predictor (i.e., the pixel on the left). The pixel value can be reconstructed using the palette table. In the copy-above mode, no palette index related to the predictors (i.e., the above pixels) needs to be transmitted since the above pixels have been reconstructed. The current pixels can be "copied" from the above pixels.

In JCTVC-N0247, palette of each component are constructed and transmitted. The palette can be predicted (shared) from its left neighboring CU to reduce the bitrate. In JCTVC-O0218, each element in the palette is a triplet, which represents a specific combination of the three color components. Furthermore, the predictive coding of palette across CU is removed.

Another palette coding technique similar to JCTVC-O0218 has also been disclosed. Instead of predicting the entire palette table from the left CU, individual palette color entry in a palette is predicted from the exact corresponding palette color entry in the above CU or left CU.

For transmission of pixel palette index values, a predictive coding method is applied on the indices as disclosed in JCTVC-O0182 (Guo et al., "AHG8. Major-color-based screen content coding", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). Three types of line modes, i.e., horizontal mode, vertical mode and normal mode are used for coding each index line. In the horizontal mode, all the indices in the same line have the same value. If the value is the same as the first pixel of the above pixel line, only line mode signaling bits are transmitted. Otherwise, the index value is also transmitted. In the vertical mode, it indicates that the current index line is the same with the above index line. Therefore, only line mode signaling bits are transmitted. In normal mode, indices in a line are predicted individually. For each index position, the left or above neighbors is used as a predictor, and the prediction symbol is transmitted to the decoder.

Furthermore, pixels are classified into major color pixels (with palette indices pointing to the palette colors) and Escape pixel according to JCTVC-O0182. For major color pixels, the pixel value is reconstructed according to the major color index (i.e., palette index) and palette table in the decoder side. For Escape pixel, the pixel value is further signaled in the bitstream.

Palette Table Signaling

In the reference software of screen content coding (SCC) standard, SCM-2.0 (Joshi et al., *Screen content coding test model 2* (*SCM 2*), Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R1014), an improved palette scheme is integrated in JCTVC-R0348 (Onno, et al., *Suggested combined software and text for run-based palette mode*, Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R0348). The palette table of previous palette-coded CU is used as a predictor for current palette table coding. In palette table coding, the current palette table is signaled by choosing which palette colors in the previous coded palette table (palette predictor) are reused, or by transmitting new palette colors. The size of the current palette is set as the size of the predicted palette (i.e., numPredPreviousPalette) plus the size of the transmitted palette (i.e., num_signaled_palette_entries). The predicted palette is a palette derived from the previously reconstructed palette coded CUs. When coding the current CU as a palette mode, those palette colors that are not predicted using the predicted palette are directly transmitted in the bitstream (i.e., signaled entries).

An example of palette updating is shown as follows. In this example, the current CU is coded as palette mode with a palette size equal to six. Three of the six major colors are predicted from the palette predictor (numPredPreviousPalette=3) and three are directly transmitted through the bitstream. The transmitted three colors can be signaled using the exemplary syntax shown below.

num_signaled_palette_entries=3
for(cIdx=0; cIdx<3; cIdx++)//signal colors for different components
  for(i=0; i<num_signaled_palette_entries; i++)
    palette_entries[cIdx][numPredPreviousPalette+i]

Since the palette size is six in this example, the palette indices from 0 to 5 are used to indicate the major color entries in the palette color table. The 3 predicted palette colors are represented with indices 0 to 2. Accordingly, three new palette entries are transmitted for indexes 3 through 5.

In SCM-2.0, if the wavefront parallel processing (WPP) is not applied, the palette predictor table is initialized (reset) at the beginning of each slice or at the beginning of each tile. If the WPP is applied, the last coded palette table is not only initialized (reset) at the beginning of each slice or at the beginning of each tile, but also initialized (reset) at the beginning of each CTU row.

Palette Prediction Coding

In JCTVC-O0218 and JCTVC-N0247, the palette prediction flags are used for predicting the palette from the last coded palette CU. One bit is used for each entry. If the palette prediction flag of a palette entry is 1, this palette is reused for the current CU.

In JCTVC-R0348, a different binarization method for the codeword is disclosed, where the zero-runs between each predicted palettes are coded. The codeword N means there are N zeros before the next palette reuse flag that is 1. For example, a "0" means that the next palette is reused (i.e., no 0 between the current and next reuse flag 1). A "1" means the second next palette is reused. Another example for the zero-run based palette prediction is shown in FIG. 1 for a palette prediction table with 10 palettes. The palette at palette table entries corresponding to 0, 2, 3, 5, and 8 are reused by the current CU. The zero-runs of the predicted palettes are {0, 1, 0, 1, 2} respectively.

The binarization method can be Exponential-Golomb code with order-K (EG-K code), truncated Exponential-Golomb code with order-K (truncated EG-K code), or N-bit Truncated Unary code+EG-K code. The K can be 0, 1, 2, or 3. The N can be 0, 1, 2, or 3.

In order to signal the last used palette, a method to insert an end-code (EC) into the codeword is disclosed in JCTVC-R0228 (Seregin, et al., *Non-SCCE3: Run-length coding for palette predictor*, Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R0228). The zero-runs that are equal to or larger than EC will be increased by one. In the decoder side, if the decoded zero-run is equal to EC, it means that there is no other predicted palette. If the decoded zero-run is larger than EC, the actual zero-run is the decoded zero-run minus one. For example, the EC can be set to 1 and any zero-run larger than or equal to 1 will be increased by 1. Accordingly, the encoded/decoded codewords for the example in FIG. 1 becomes {0, 2, 0, 2, 3, 1} as shown in FIG. 2.

In the existing palette coding, the decoder may encounter problems when the predictor is an Escape pixel. For example, if the copy-above mode is selected and an above pixel is an Escape pixel, a current pixel below the Escape pixel may not be reconstructed properly. According to the existing copy-above mode, only the run value is signaled. An Escape index can be assigned to the current pixel below the above Escape pixel. However, since the Escape value is not transmitted, the current pixel below the above Escape pixel cannot be reconstructed. Accordingly, it is desirable to develop methods to overcome the issue associated with a predictor being an Escape pixel.

SUMMARY

Methods to overcome issues associated with predictors being an Escape pixel in palette coding using a copy mode are disclosed. According to one embodiment of the present invention, if the predictor for a copy-above mode is an Escape pixel, the Escape value for the current Escape pixel is transmitted so that an Escape pixel associated with the predictor can be reconstructed using the transmitted escape value. The escape value for each component of the Escape pixel can be transmitted. The run value corresponding to the number of consecutive pixels being predicted by the copy-above mode can be signaled, derived or inferred. If the run value is signaled, it can be signaled before the Escape values for the Escape pixels. If the above pixel located above a leading pixel of the current pixels is an Escape pixel, run value can be restricted to be zero. If the current coding mode corresponds to the copy-index mode and the signaled index is escape index, a run value corresponding to the number of consecutive pixels being predicted by the copy-index mode can be signaled, derived or inferred. If the run value is signaled, it can be signaled before the Escape values for the Escape pixels. The consecutive pixels are coded as Escape pixels. The palette index of the consecutive Escape pixels are coded as Escape index, and the Escape values of the Escape pixels are transmitted. The adjusted maximum palette index (AdjustedMaxPaletteIndex) is fixed to be equal to the maximum palette index minus 1 (i.e., MaxPalettelndex- 1) except for the first sample in the CU. An embodiment for a corresponding decoder side is also disclosed.

In another embodiment, the issue associated with the predictor being an Escape pixel is resolved by applying restriction to the encoder side. In the copy-above mode, whenever an above pixel located above a current pixel is an Escape pixel, the copy-above run is terminated, the copy-above mode is designated as unavailable for the current pixel, or the copy-above mode is not selected for the current pixel. Therefore, the issue associated with the predictor being an Escape pixel will never occur.

In yet another embodiment, the issue associated with the predictor being an Escape pixel is resolved by directly copying the Escape value, both the Escape index and Escape value, or the reconstructed pixel value of the predictor when the predictor is an Escape pixel. For example, in the copy-above mode, if the above pixel located above a current pixel is an Escape pixel, the current pixel can be reconstructed by copying the Escape index and Escape value, or the reconstructed pixel value of the above pixel.

In yet another embodiment, the issue associated with the predictor being an Escape pixel is resolved by replacing the predictor by a pre-defined palette index, such as palette index 0. For example, in the copy-above mode, any above pixel being an Escape pixel is treated as the pre-defined index. In other words, if the current pixel is a pre-defined index and the above pixel is an Escape pixel, the copy-above run will continue. In the case of the copy-index mode, if N consecutive pixels are Escape pixels, the leading pixel will be coded by transmitting the palette index (i.e., the Escape index) and the pixel value (i.e., the Escape value). All following pixels will be coded as the pre-defined index.

BRIEF DESCRIPTION OF DRAWINGS

FIGS. 3A-B illustrate an example of converting color values of neighboring pixels to color indices according to the color index table of Table 1, where the neighboring pixel values in FIG. 3A are converted to neighboring pixel indices in FIG. 3B.

FIG. 4 illustrates an example of color index prediction from neighboring pixels, where the index of the first pixel is decoded as 1 using the above neighboring pixel as a predictor.

FIG. 5A illustrates an example of redundancy associated with the previous copy-above mode, where the current sample is indicated as a "?" and the above index is "A".

FIG. 5B illustrates an example of redundancy associated with the previous copy-above-right mode, where the current sample is indicated as a "?" and the above-right index is "C".

FIG. 6A illustrates an example of redundancy associated with the previous copy-index mode, where the current sample is indicated as a "?" and the left index is "A".

FIG. 6B illustrates an example of using a replacement index predictor in case of redundancy determined according to an embodiment of the present invention.

DETAILED DESCRIPTION

Figure 1:
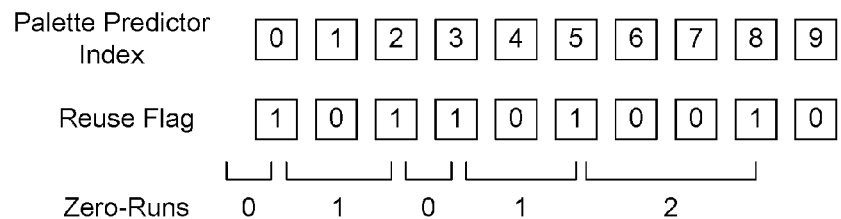
FIG. 1 illustrates an exemplary zero-run based palette prediction, where palette table entries corresponding to 0, 2, 3, 5, and 8 are reused by the current CU and the zero-runs of the predicted palettes are {0, 1, 0, 1, 2} respectively.
Figure 2:
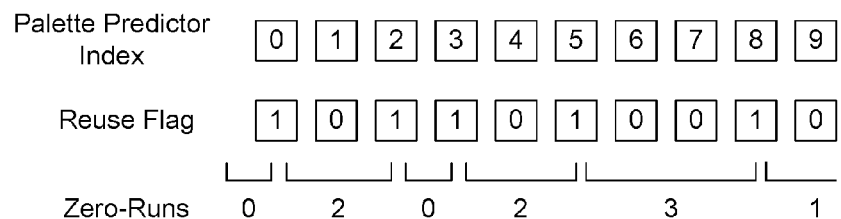
FIG. 2 illustrates an exemplary zero-run based palette prediction, where an end-code (EC) corresponding to "1" is used to indicate the end of reuse flag coding and the zero-runs corresponding to FIG. 1 become {0, 2, 0, 2, 3, 1}.

The following description is of the best-contemplated mode of carrying out the invention. This description is made for the purpose of illustrating the general principles of the invention and should not be taken in a limiting sense. The scope of the invention is best determined by reference to the appended claims.

Issues with Escape Pixel as a Predictor in a Prediction Mode

In JCTVC-O0218, JCTVC-N0247 and JCTVC-O0182, several prediction modes, such as the copy-above mode and the copy-index mode, are supported for the palette index map coding. The copy-index mode is also referred to as "copy left mode" sometimes since the index of the left pixel is copied when the pixels in a block is processed in a raster scan order from left to right. Furthermore, the copy left mode may also be extended to refer to copying a previous pixel in a traverse scan order in this disclosure. In these modes, the color indices are copy from the predictors, such as one or more above samples or the left sample. In Screen Content Coding Test Model 2 (SCM-2.0), the run-based palette coding method similar to JCTVC-O0218 and JCTVC-N0247 is integrated. In SCM-2.0, the copy-above mode and the copy-index mode are used. The Escape sample is coded with the color index equal to the maximum palette size in the run mode. In the run mode, if the coded palette size is equal to the maximum palette size in the copy-index mode, the values of each component (e.g. R/G/B component or Y/U/V component) are signaled.

However, in SCM-2.0, if the copy-above mode is used and the above sample is coded as the Escape index, the Escape values are not signaled. The decoder will not be able to reconstruct these sample values. In order to overcome this problem, various methods are disclosed as follows:

A. Encoder Constraint for Escape Values Signaling

According to this embodiment, an encoder constraint is disclosed so that an Escape sample or an Escape color index can be coded in the copy-index mode or the new index mode only. In other words, no other prediction copy mode, such as the copy-above mode, is allowed for this case. Accordingly, in the case of copy-above mode, only non-Escape pixels of the above pixels can be used as predictors for the copy-above mode. Therefore, if the copy above mode is applied, there is no need to signal the Escape value. In this disclosure, a sample and a pixel are used interchangeably. Accordingly, an Escape sample may also be called an Escape pixel.

B. Disallowing Escape Sample as Predictor

According to this embodiment, an Escape sample or an Escape color index can be coded in the copy-index mode or the new index mode only. In other words, no other prediction copy mode, such as the copy-above mode, is allowed for this case. Therefore, if the predictor copy mode (e.g. the copy above mode) is applied, there is no need to signal the Escape value. Furthermore, if the predictor in a copy mode (e.g. the above sample in the copy-above mode) is an Escape sample, the copy mode will not be available. The syntax of the copy mode can be removed. For example, if the above sample is an Escape sample, there will be no copy-above mode for the current sample. For example, the current prediction mode can be inferred as the copy-index mode if the above sample is an Escape sample. In another example, the color index of above sample is copied for the current pixel if the copy above mode is used. If the above sample is an Escape sample, the index copy procedure can be terminated. For example, if the copy-above mode is signaled, the run is 5 and the above third sample is an Escape sample, it will only copy the above two samples. The actual run value is equal to 1.

C. Direct Copy of Reconstructed Pixel Value in the Copy Mode

In the copy mode, a value, "palette_run" (e.g. N) is transmitted, derived or inferred to indicate that for the current pixel and the following N pixels, the pixels values are equal to the reconstructed pixel values in the respective positions coded in the copy mode (e.g. above, left, top-left, above M line, or top-right position). No Escape code (e.g. coding the Escape value) is required in these predictor copy modes.

In this method, the palette_run can be signaled for the copy-index mode even if the signaled index is equal to the Escape index. If the palette_run for Escape index is larger than 0 (e.g. N), the decoder will fill the reconstructed value for current sample and N following samples. The Escape values can be signaled after the palette_run syntax.

D. Direct Copy of Escape Value and Index in the Copy Mode for the Escape Sample Predictor.

In the copy mode, a value, "palette_run" (e.g. N) is transmitted, derived or inferred to indicate that for the current pixel and the following N pixels, the color indices are equal to the respective color indices in the positions coded in the copy mode, the color indices are equal to the color indices in the respective copy mode position (e.g. above, left, top-left, above M line, top-right, . . . ). However, if the predictor is an Escape sample, the current sample not only copies the index (i.e., the Escape index) but also copies the Escape values (e.g. palette_Escape_val) from the predictor. No Escape code (e.g. coding the Escape value) is required in these predictor copy modes.

The palette_run can be signaled for copy-index mode even if the signaled index is equal to the Escape index. If the palette_run for Escape index is larger than 0 (e.g. N), the decoder will fill the Escape values for the current sample and the following N samples. The Escape values can be signaled after the palette_run syntax. In another example, if the palette_run for Escape index is larger than 0, (N+1) samples of Escape values are signaled.

E. Direct Copy of Escape Value in Copy Mode for the Escape Sample Predictor

In the copy mode, a value "palette_run" (e.g., N) is transmitted, derived or inferred to indicate that for the current pixel and the following N pixels, the color indices are equal to the color indices in the respective copy mode position (e.g. above, left, top-left, above M line, top-right, . . . ). However, if the predictor is an Escape sample, the current sample copies the Escape values (e.g. palette_Escape_val) from the predictor and sets the current index as a pre-defined index (e.g. 0). No Escape code (e.g. coding the Escape value) is required in these predictor copy modes.

In this method, the palette_run can be signaled for copy-index mode even if the signaled index is equal to the Escape index. If the palette_run for the Escape index is larger than 0 (e.g. N), the first sample is reconstructed with the Escape value, and the rest samples are reconstructed with the pre-defined index. The Escape values can be signaled after the palette_run syntax.

F. Treating the Escape Sample as a Pre-Defined Color Index in Predictor Copy Mode for the Escape Sample Predictor In the copy mode, a value "palette_run" (e.g., N) is transmitted, derived or inferred to indicate that for the current pixel and the following N pixels, the color indices are equal to the color indices in the respective copy mode position (e.g. above, left, top-left, above M line, top-right, . . . ). However, if the predictor is an Escape sample, the color index of the predictor is treated as a pre-defined color index (e.g. 0) according to an embodiment of the present invention. For example, if the copy-above mode is signaled for a current pixel and the predictor (i.e., the pixel above the current pixel) is an Escape pixel, the predictor is treated as a pre-defined index. Therefore, if the current pixel is equal to the pre-defined index, the copy-above run will continue. At the decoder side, the current index is set to the pre-defined index if the predictor (i.e., the pixel above the current pixel) is an Escape pixel. No Escape code (e.g. coding the Escape value) is required in these predictor copy modes.

This embodiment can also be applied to the case of copy-index mode. Therefore, the palette_run can be signaled for the copy-index mode even if the signaled index is equal to the Escape index. The Escape values associated with the signaled index can be signaled after the palette_run syntax. If the palette_run for Escape index is larger than 0, the first sample is reconstructed with the Escape value, and the remaining samples are reconstructed with the pre-defined index. For example, if with the copy-index mode is used and the palette_run is 4, the leading pixel is an Escape pixel and the following four pixels are having the pre-defined index. The five pixels will be coded using the copy-index mode according to the current embodiment. It is apparent that the copy-index mode is modified from the conventional the copy-index mode by enabling the leading pixel being an Escape pixel and treating this predictor as a pre-defined index. In another example, if the palette_run for the Escape index is larger than 0 (e.g. N), the first sample is reconstructed with the Escape value, and the remaining samples also need to signal the Escape values for each sample. The remaining samples are reconstructed with the signaled Escape values respectively. (N+1) samples of Escape values are signaled.

According to one embodiment, the adjusted maximum palette index (AdjustedMaxPaletteIndex) in copy-index mode is fixed (e.g. fixed to MaxPaletteIndex−1) except for the first sample in the coding unit (CU). For the first sample in the CU, the AdjustedMaxPaletteIndex is equal to MaxPaletteIndex. The AdjustedMaxPaletteIndex is independent of whether the predictors or the last coded indices are Escape sample or not. This parameter can be used for index coding with fixed-length code coding or truncate binary code coding.

G. Sending the Escape Value if the Predictor is Escape Sample

In the copy mode, a value "palette_run" (e.g., N) is transmitted, derived or inferred to indicate that for the current pixel and the following N pixels, the color indices are equal to the color indices in the respective copy mode position (e.g. above, left, top-left, above M line, top-right, . . . ). However, if the predictor is an Escape sample, the Escape code (e.g. coding the Escape value) is signaled for these samples according to an embodiment of the present invention. For example, if the above sample is an Escape sample and copy-above mode is selected for the current sample (also referred to as the current escape pixel), the Escape value of each component for the current sample is signaled. That is, if the copy-above mode is select and the above pixel is escape pixel, the values of 3-component (e.g., YUV components or RGB components) for the current pixel will be signaled. The Escape values can be signaled after the "palette_run". The number of the Escape values to be signaled depends on the number of Escape samples being predicted from the predictors. Furthermore, if the first sample from the predictor is Escape sample, the palette_run can be inferred as 0 or set to 0.

Another constraint can be added that the palette_run will be ended if the predictor is an Escape sample. In this way, the palette_run can be terminated.

H. Sending Escape Value with Escape Run if the Predictor is Escape Sample

In the copy mode, a value "palette_run" (e.g., N) is transmitted, derived or inferred to indicate that for the current pixel and the following N pixels, the color indices are equal to the color indices in the respective copy mode position (e.g. above, left, top-left, above M line, top-right, . . . ). However, if the predictor is an Escape sample, an Escape code (e.g. coding the Escape value) is signaled for these samples. For example, if the above sample is an Escape sample and the copy-above mode is selected, the Escape values of each component are signaled for the current sample (also referred to as the current escape pixel). The Escape values can be signaled immediately after the "palette_run". The number of Escape values to be signaled depends on the number of Escape samples being predicted from the predictors. For the copy-index mode, when the signaled index is the Escape index, a palette_run can be signaled to indicate that the current pixel and the following N pixels are Escape samples. The Escape codes (e.g. coding the Escape value) are signaled for these samples. The Escape values can be signaled after the palette_run syntax.

According to this embodiment, the adjusted maximum palette index (AdjustedMaxPaletteIndex) in copy-index mode is fixed (e.g. fixed to MaxPaletteIndex−1) except for the first sample in the coding unit (CU). For the first sample in the CU, the AdjustedMaxPaletteIndex is equal to MaxPaletteIndex. The AdjustedMaxPaletteIndex is independent of whether the predictors or the last coded indices are Escape sample or not. This parameter can be used for index coding with fixed-length code coding or truncate binary code coding.

I. Index Prediction from Escape Index

If the prediction source (e.g. the above index or the left index) is an Escape index, the index of the current sample is inferred as the Escape index. Escape value for the current sample is then signaled.

For example, if the current palette_run is signaled as a copy-above mode and at least one above samples is the Escape index, the samples having the Escape index are inferred as the Escape index. Escape values are then signaled.

In another example, if the current palette_run is signaled as a copy-left mode and the left index is the Escape index, the current sample is inferred as the Escape index. Escape value is then signaled. Accordingly, if the current palette_run is signaled as the copy-index mode and the new signaled index is the Escape index, all samples associated with the palette_run are inferred as the Escape index. Escape values are then signaled.

In this embodiment, when N samples in a palette_run are inferred as the Escape index, M Escape pixel values are signaled, where N and M are positive integers. M can be equal to N and individual Escape pixel values are signaled for all samples in a palette_run for this case. M can be less than N and Escape pixel values are transmitted for partial samples in a palette_run and remaining samples share the transmitted Escape values. For example, M is one and one Escape value is transmitted for all samples are inferred as the Escape index to share this Escape value.

J. Index Prediction from Escape Index by Using Derived or Pre-Defined Index

If the prediction source (e.g. the above index or the left index) is the Escape index, the index of the current sample is inferred as a derived or a pre-defined index if the source is used for prediction. The pre-defined index can be 0.

For example, if the current palette_run is signaled as the copy-above mode and at least one of the above samples is the Escape index, the samples with the Escape index are inferred as a derived or pre-defined index if the related prediction mode is used. The pre-defined index can be 0.

In another example, if current palette_run is signaled by the copy-index mode and the left index is the Escape index, the current sample is inferred as a derived or pre-defined index if the related prediction mode is used. The pre-defined index can be 0.

In another example, if current palette_run is signaled by the copy-index mode, a palette_run value will be signaled to indicate whether the new signaled index is the Escape index or not. If the new signaled index is the Escape index, the first sample in the palette_run is inferred as the Escape index and remaining sample are inferred as a derived or pre-defined index. The pre-defined index can be 0.

K. Removing Redundant Index in Index Coding

In SCM 2.0, the decoder needs to check several conditions so that a redundant index can be removed. For example, the decoder may check whether the previous palette_run is the copy-above mode and whether the above sample is not coded as the Escape index. If both conditions are true, the index of the above sample can be treated as a redundancy index value and removed during index coding.

In one embodiment, the condition checking can be removed in the parsing stage. If the copy-index mode is used in any sample position except for the first sample in a CU, there is at least one redundant index value. Therefore, in the parsing stage, the decoder can directly remove the fixed redundant index number (e.g. 1) without any condition checking.

If any prediction method is applied to the first sample in a CU (e.g. prediction across CU boundary), the Escape pixel prediction disclosed previously can be combined with the redundancy removal process disclosed above. Index value parsing method can be refined as follows: if the copy-index mode is used in any sample position, there is at least one redundant index value. Therefore, in parsing stage, the decoder can directly remove a fixed redundant index without any condition checking.

L. Reconstruction of Index Value after Removing Redundant Index in Index Coding

In index reconstruction stage, the decoder will calculate the removed redundant index value. If the parsed index value is larger or equal to the removed redundant index value, the reconstructed index value is equal to the parsed index value plus 1. Otherwise, the reconstructed index value is the parsed index value.

Based on the embodiment disclosed in "I. Index prediction from Escape index", if the prediction source is the Escape index, the removed redundant index value is the Escape index value.

Based on the embodiment disclosed in "J. Index prediction from Escape index by using derived or pre-defined index", if the prediction source is the Escape index, the removed redundant index value is a derived or pre-defined index. The pre-defined index can be 0.

M. Prediction for the Color Index Map Coding from Neighboring Pixels

Major color index map of the current CU can be predicted from the neighboring pixels (NPs) of the current CU. When coding color index map, the encoder/decoder can first determine the neighboring pixels (NPs). The NPs can be used to predict the color index of the current coding unit. Before prediction, the pixel value of the NP can be mapped into a color index by a major color table, and the mapped color index is used to predict the color index of the current coding unit. For example, by using the major color table of current coding unit as sown in Table 1, the pixel value of the NP can be mapped into color indexes as shown in FIG. 3A and FIG. 3B, where the values of neighboring pixel are indicted by italics and parenthesis and the mapped color indexes are indicted below the pixel values of the respective NPs.

TABLE 1

| Color index | Pixel value |
|---|---|
| 1 | 20 |
| 2 | 200 |

The NPs can be any previously decoded or reconstructed pixels, including spatial neighboring or temporal neighboring samples and respective residues. The neighboring pixels can be the reconstructed pixels without any in-loop filtering such as sample adaptive offset (SAO) or deblocking filter. The neighboring pixels can also be the reconstructed pixels filtered by SAO, deblocking filter or both SAO and deblocking filter. Temporal NPs can be the pixels at the collocated position in the reference picture or the locations indicted by motion vectors. In one example, NPs is simplified to the pixels of the nearest above row and the nearest left column.

Figures 4, 5A, 5B, 6A, 6B:
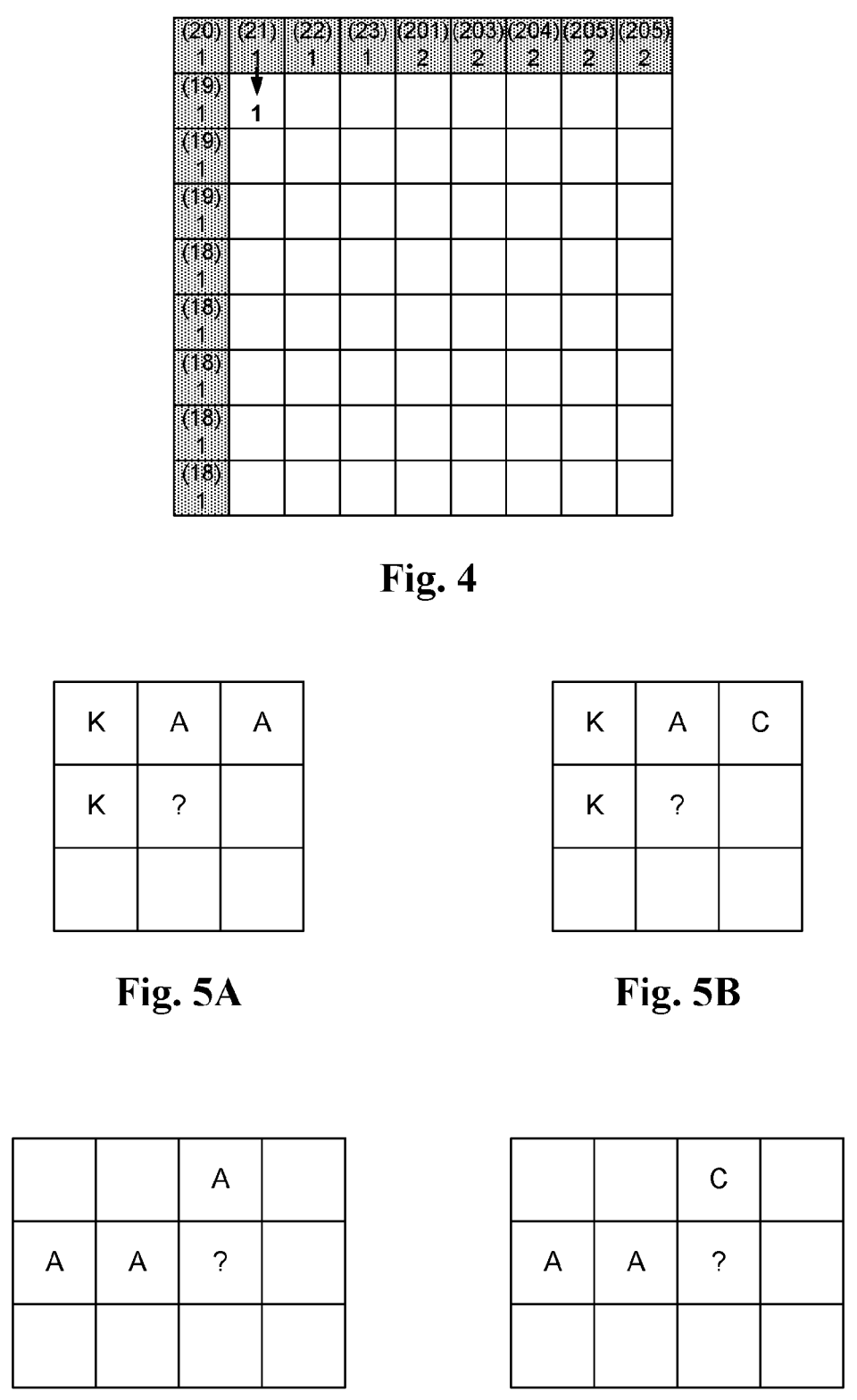

During decoding, the color index can be predicted by NPs. FIG. 4 illustrates an example, where the color index of the pixel is predicted by the above NP. The index of the first pixel is decoded as 1 in this example.

To simplify quantization method for mapping the color values of the NPs to color indices, the decoder may test only partial colors in the palette. If there is no matched color for a NP, the decoder can assign a fixed or derived index to the NP. For example, the decoder only test the color indices form Ntest1 to Ntest2. If there is no matched color, the decoder assigns the NP an index Ntest3 and Ntest3 can be 0. Ntest1 and Ntest2 can be fixed or derived. Ntest1 and Ntest2 can be derived according to the CU size.

To identify a matched color for a NP, decoder may also test $N_{test}$ colors with a NP. If the difference between a tested color, $C_{test1}$, and the NP is less than a threshold, the NP is assigned an index $C_{test1}$. The threshold can be fixed or derived. For example, the threshold can be derived according to QP setting. If there is more than one tested color with a corresponding difference less than the threshold for a NP, the NP can be quantized to the tested color with a smaller difference.

To simplify quantization of the NP values to color indices, if there is more than one tested color with the difference less than the threshold for a NP, the NP can be quantized to the latest tested color. The order to test color can be from the largest index to the smallest index (i.e. the smallest occurrence index to the highest occurrence index). In other words, a higher occurrence index will overwrite a smaller occurrence index if both of them are within the difference threshold.

In another embodiment, if there is more than one tested color with a difference less than the threshold for a NP, the NP can be quantized to the earliest tested color. The order to test color can be from the smallest index to the largest index (i.e. the highest occurrence index to small occurrence index). The test process can be early terminated if any test color is matched.

Another method to simplify the quantization of NP values to color indices, the decoder can use only $N_{MSB\_COLOR}$ MSBs of color values to compare with a pixel with the colors in the palette. $N_{MSB\_COLOR}$ can be fixed or derived. $N_{MSB\_COLOR}$ can be derived according to the CU size. For different color components, $N_{MSB\_COLOR}$ can be different. For example, $N_{MSB\_COLOR}$ for the Y/G component can be larger than the $N_{MSB\_COLOR}$ for the UV/RB component.

The techniques of "Escape color with prediction mode" and "Prediction for color index map coding from NPs" disclosed above can be unified. For example, the decoder can directly quantize NPs into the Escape index for "Prediction for color index map coding from NPs". As the result, if pixels in the first row are signaled as the copy-above mode, the pixel will be predicted from the Escape index. To deal with prediction from an Escape index, "Direct copy of the reconstructed value in the copy mode" or "Direct copy of the reconstructed value in the copy mode for the Escape sample predictor". In other words, the decoder will copy reconstructed pixel values of NPs to the pixels in the first row. The reconstructed index of the pixels predicted from above in the first row can be inferred as the Escape index.

One aspect of the present invention addresses color index coding for coding the "Escape" index. Index "Escape" is imposed on the pixels whose value cannot be mapped to any index in the palette table. Various embodiments for color index coding are disclosed as follows.

i. Runs of Escape

In the palette coding scheme disclosed in JCTVC-N0247, "copy_index mode" and the index "Escape" are first signaled and followed by its actual pixel value in order to code a pixel with the index "Escape". When pixels with index "Escape" are located consecutively, this process is repeated for each pixel with the index "Escape". For example, the set of syntaxes corresponding to {"copy_index_mode", "Escape index", value} can be repeated for consecutive pixels with index "Escape". In one embodiment, a new prediction mode (e.g. "Escape run mode") in addition to the "copy_index mode" or "copy_above mode" is included for the Escape index. After signaling the mode, "number of run" and pixel values are signaled without signaling index "Escape". An exemplary process is described as follows:
1) For each position, a flag is transmitted to indicate the prediction mode selected among "copy_above mode", "copy_index mode" and "Escape run mode".
2. If "copy_above mode" is used, "palette_run" is transmitted following the flag. The indices for the number of runs from the current position are the same as those in the above line along the scan order.

3. If "copy_index mode" is used, "palette_index" is signaled after the flag and followed by "palette_run". For the number of runs, the indices are the same as the index signaled.
4) If "Escape run mode" is used, "palette_run" is signaled. Pixel values for the number of runs are signaled.

ii. Escape in the Copy Above Mode

When a pixel is in the "copy_above mode", the index of the pixel is same as its above pixel along the scanning direction. The prior arts do not define the process when Escape pixels or Escape indices are included in the run of "copy_above mode". In one embodiment, whether the run of the "copy_above mode" includes Escape index or not is signaled. An exemplary process and signaling according to this embodiment is described as follows.

1) If "copy_above mode" is used, "palette_run" is signaled following the mode flag. The indices for the number of runs from the current position are the same as those in the above line along the scan order.
2) After the number of runs, "Escape in the run" flag is transmitted to indicate whether any Escape pixel is present in the "copy_above" pixels.
3) If "Escape in the run" is true, the pixel values of these Escape pixel are signaled in a sequential order In the above example, the number of Escape index is derived. In another embodiment, the number of "Escape" index in the current set of "copy_above mode" can be signaled explicitly before signaling pixel values. This explicit signaling can substitute for the "Escape in the run" flag.

iii. Signaling of "Palette_Run"

The "palette_run" can be signaled before or after signaling the index. In the prior art, "number of runs" is signaled after the index. In embodiments of the present invention, the signaling order of "palette_run" is adaptive. For example, the "palette_run" is signaled before the "index" when "index" is present or after the prediction mode when "index" is not present. Exemplary process and signaling according to an embodiment are described as follows.

1) For each position, a flag is first transmitted to indicate the prediction mode selected from "copy_above mode" and "copy_index mode".
2) "palette_run" is transmitted.
3) When "copy_above mode" is used, the indices for the number of runs from the current position are the same as those in the above line along the scan order.
4) When "copy_index mode" is used, "index" is signaled after the flag.
   a. If the "index" is "Escape", the pixel values for the number of runs from the current position are signaled.
   b. If the "index" is in the palette table, the indices for the number of runs from the current position are the same as the index signaled.

The technique of signaling of "palette_run" disclosed above can be combined with other techniques disclosed in this invention.

In another example, the "palette_run" is signaled before the prediction mode and index. Exemplary signaling and process are disclosed as follows.

1) For each position, "palette_run" is signaled.
2) A flag is signaled following "palette_run" to indicate the prediction mode selected from "copy_above mode" and "copy_index mode".
   a. If "copy_above mode" is used, the indices for the number of runs from the current position are same as those in the above line along the scan order.
   b. If "copy_indexmode" is used, "index" is signaled after the flag.
      i. If the "index" is "Escape", the pixel values for the number of runs from the current position are signaled.
      ii. If the "index" is in the palette table, the indices for the number of runs from the current position are same as the index signaled.

The technique of signaling of "palette_run" disclosed above can be combined with other techniques disclosed in this invention.

In another embodiment, when the "palette_run" is equal to one, the index is signaled for the current position. In other words, no signaling of the prediction mode is needed. If the index is Escape, the pixel value is signaled after the Escape index. Exemplary signaling and process are shown as follows.

1) For each position, "palette_run" is signaled.
2) If the "palette_run" equals to 1, "index" is signaled. Furthermore, if the "index" is "Escape", the pixel value is signaled.
3) Else (i.e., the "palette_run" is greater than 1)
   A flag is signaled following "palette_run" to indicate the prediction mode selected between "copy_above mode" and "copy index mode".
   a. If "copy_above mode" is used, the indices for the number of runs from the current position are same as those in the above line along the scan order.
   b. If "copy_index mode" is used, "index" is signaled after the flag.
      i. If the "index" is "Escape", the pixel values for the number of runs from the current position are signaled.
      ii. If the "index" is in the palette table, the indices for the number of runs from the current position are the same as the index signaled.

The technique of signaling of "palette_run" disclosed above can be combined with other techniques disclosed in this invention.

iv. Signaling of Pixel Values for "Escape"

When pixel values corresponding to the "Escape" index is signaled, the actual value can be directly signaled. Instead of directly signaling the sample values, the difference between the actual value and a reference value can also be signaled (i.e., differential coding). In the prior art, the reference values for differential coding is based on already reconstructed Escape values in the same CU. In some embodiments of the present invention, other reference values may also be used. For example, the reference value can be directly signaled or derived. In another example, the reference value can be the N-th index in the palette predictor table, wherein the index N and the value difference are signaled. In yet another example, the reference value can be the reconstructed value from the neighboring blocks. The reference value can be reconstructed conventional Intra/Inter, palette value, or Escape values. The reference value can be the minimum pixel value in consecutive "Escape" pixels. Also, the reference value can be the N-th value in consecutive "Escape" pixels.

N. Hilbert Index Scan for Transition Copy Prediction

In Transition copy (TC) prediction, a value "palette_run" (e.g., N) is transmitted or derived to indicate that for the current pixel and the following N pixels, the palette index is equal to the transition-copy-table-derived (TCT derived) indexes. N can be one.

During decoding, the decoder maintains a transition copy table (TCT) to recode the relation between previous K decoded indexes and following N indexes. Then, before decoding new N indexes, the decoder use previous K decoded indexes to search the prediction pattern of following N indexes. N and K are transmitted or derived.

For transition copy, the color indices in a block are processed according to a scan pattern traversing through the block. According to an embodiment of the present invention, the index map is scanned using Hilbert scan order. The run lengths resulted from the Hilbert scan are then encoded. The start position can be changed for the Hilbert scan. The index map can be rotated first and then scanned. The scan pattern can be used for different palette related coding, such as those disclosed in JCTVC-R0348.

O. Removing Redundant Prediction Mode Syntax

One embodiment of the present invention removes the prediction mode syntax if the prediction mode is redundant. For example, if the above pixel is the Escape pixel, the copy-above mode can be removed and the prediction mode can be inferred as copy-index mode.

In another example, if the last prediction mode is copy-index mode, the above pixel is not the Escape pixel, and the indices of the above pixel and previous pixels are the same, the copy-above mode can be removed. The prediction mode can be inferred as copy-index mode.

In yet another example, if the last prediction mode is copy-index mode and the indices of above pixel and previous pixels are the same, the copy-above mode can be removed. The prediction mode can be inferred as copy-index mode.

In yet another example, if the above pixel is the Escape pixel or if the last prediction mode is copy-index mode and the indices of above pixel and previous pixels are the same, the copy-above mode can be removed. The prediction mode can be inferred as copy-index mode.

P. Refining Copy Above Run Mode's Prediction Source

In the palette coding, the redundant index $I_{run\_red}$ of the current pixel can be derived from the last coded prediction mode. For the prediction mode other than the last coded prediction mode, if the first index predictor is the same as the $I_{run\_red}$, the first index predictor can be replaced by a replacement index that is a fixed index or derived index. The replacement index can be 0 or the smallest possible and non-redundant index that is not equal to $I_{run\_red}$. For example, if $I_{run\_red}$ is 0, the replacement index can be set to 1; otherwise, replacement index can be set to 0. The index replacement method can be disabled if the $I_{run\_red}$ is equal to the Escape index.

In SCM2.0, if the previous prediction mode is the copy-above mode, the current index cannot be the same as the above index. Otherwise, the current index coding can be merged into the previous run of the copy-above mode. This redundant index value is referred to as $I_{run\_red}$. FIG. 5A illustrates an example of redundancy associated with the copy-above mode, where the current sample is indicated as a "?" and the above index is "A". The current index cannot be "A" and index A is redundant for coding the current index. Therefore, in this case, refinement of the prediction source is disclosed if other prediction mode is used. For example, if the prediction mode is copy-above-right, the index of the above-right pixel cannot be A. It can be replaced by a replacement index corresponding to a fixed index or derived index, such as index C as shown in FIG. 5B, where "C" can be 0 or the smallest possible and non-redundant index that is not equal to $I_{run\_red}$. For example, if $I_{run\_red}$ is 0, index C can be set to 1; otherwise, index C can be set to 0.

In another embodiment, if the previous prediction mode is the copy-index mode, the current index cannot be the same as the left index. Otherwise, the current index coding would be merged into the previous run of the copy-index mode. This redundant index value is referred to as $I_{run\_red}$. FIG. 6A illustrates an example of redundancy associated with the copy-above mode, where the current sample is indicated as a "?" and the above index is "A". However, if the above index of current to-be-encode index is equal to $I_{run\_red}$, the copy above prediction of current index is redundant. Therefore, in this case, the index predictor of the above index is replaced if the copy-above mode is used.

If the above index of current to-be-encode index is equal to $I_{run\_red}$, such as the index A in FIG. 6A, the decoder can replace the index predictor of the above index of copy-above mode by a replacement index corresponding to a fixed index or derived index, such as index C in FIG. 6B. Index C can be 0 or the smallest possible and non-redundant index that is not equal to $I_{run\_red}$. For example, if $I_{run\_red}$ is 0, index C can be set to 1; otherwise, index C can be set to 0.

In another example according to the embodiment, the $I_{run\_red}$ can be the redundant index of any prediction modes, such as the index of the above 2 rows for copy-above-2-row-mode. If the last coded mode is the copy-index mode and the previous coded index is the same as $I_{run\_red}$, the $I_{run\_red}$ of the prediction mode (e.g. the index of the above 2 rows for copy-above-2-row-mode) can be replaced with the derived index.

In yet another example according to the embodiment, if the copy-above mode is one of the coding modes that can be selected, the prediction mode is set to the copy-above mode even if the run of copy-index mode is much larger than the run of copy-above mode.

If the predictor is replaced by the replacement index, the index coding of copy-index mode can be modified. Two redundant indices (i.e., the $I_{run\_red}$ and the replacement index) can be removed. For example, if the last coded mode is copy-index mode, the above index is the same as the previous index and the above index is not an Escape index, two indices can be removed in the index coding of copy-index mode for the current pixel. One of the two indices is the previous index and the other is the replacement index.

In yet another example according to the embodiment, if the last coded mode is copy-index mode, the above index is the same as the previous index, the maximum possible index is larger than 2 and the above index is not the Escape index, two indices can be removed in the index coding of copy-index mode for the current pixel. One of the two indices is the previous index and the other is the replacement index.

In yet another example according to the embodiment, if the last coded mode is copy-index mode, the above index is the same as the previous index and the maximum possible index is larger than 2, two indices can be removed in the index coding of copy-index mode for the current pixel. One of the two indices is the previous index and the other is the replacement index.

The embodiments according to the present invention checks for one more index redundancy. This technique can also be applied to the TC refinement process as disclosed previously in this disclosure. Accordingly, when refining TC predictors based on index redundancy, the decoder can also consider the additional redundancy checked by the technique as disclosed above.

Q. Redundant Index Removal for Color Index Map Coding from Neighboring Pixels

As discussed previously in this disclosure, index redundancy exists in SCM2.0. If the previous run is the copy above run, the current index cannot be the same as the above index of the current index when it is encoded by a new copy left run. Otherwise, the current index coding can be merged into the previous run. On the other hand, in SCM2.0, there is no copy above run in the first row. Therefore, the decoder does not perform this redundant index checking of copy above run in the first row.

According to another embodiment, the redundant index removal is also applied to the first row. The redundant index removal process is modified according to neighboring pixels (NPs). When encoding the pixels in the first row, the encoder can check: whether the previous run is copy above run. The current index cannot be the same as the index of the above NPs of the current index when it is encoded by a new copy left run. In this case, $I_{run\_red}$ is equal to the index of the above NP of the current index.

To improve parsing throughput, the decoder can only parse the encoded index values (i.e., removing $I_{run\_red}$) in the parsing stage and reconstruct the true palette index (i.e., adding $I_{run\_red}$) in the reconstruction stage. Therefore, the quantization process from NPs to color indices can be moved to the reconstruction stage for improving parsing throughput.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette mode coding using palette prediction for a picture, wherein the palette prediction includes a copy-above mode for predicting one or more first pixels based on one or more second pixels located above said one or more first pixels correspondingly, the method comprising:
   receiving input data associated with a current block;
   determining a current coding mode for one or more current pixels;
   if the current coding mode is the copy-above mode, identifying one or more above pixels located above said one or more current pixels correspondingly for said one or more current pixels to copy from said one or more above pixels; and
   if said one or more above pixels include one or more current Escape pixels, signaling one or more Escape values for said one or more current Escape pixels or terminating a copy-above run at a first above pixel being one Escape pixel.

2. The method of claim 1, wherein if the current coding mode corresponds to the copy-above mode, one Escape value for each of color components of each current Escape pixel corresponding to said one or more current Escape pixels included in said one or more above pixels is signaled.

3. The method of claim 1, wherein if the current coding mode corresponds to the copy-above mode, a first number of said one or more current pixels is signaled, derived or inferred.

4. The method of claim 3, wherein when the first number of said one or more current pixels is signaled, the first number of said one or more current pixels is signaled before said one or more Escape values for said one or more current Escape pixels.

5. The method of claim 3, wherein if said one or more above pixels include one or more Escape pixels, the copy-above run is terminated at a first pixel being the Escape pixel.

6. The method of claim 1, wherein if the current coding mode corresponds to a copy-index mode and a corresponding signaled index is escape index, a second number of said one or more current pixels is signaled, derived or inferred.

7. The method of claim 6, wherein when the second number of said one or more current pixels is signaled, the second number of said one or more current pixels is signaled before said one or more Escape values for said one or more current Escape pixels.

8. The method of claim 7, wherein one Escape value for each of color components of each Escape pixel correspond to the second number of said one or more current pixels is signaled.

9. A method of palette mode decoding using palette prediction for a picture, wherein the palette prediction includes a copy-above mode for predicting one or more first pixels based on one or more second pixels located above said one or more first pixels correspondingly, the method comprising:
   receiving an input coded bitstream including compressed data of a current block;
   parsing a current coding mode for one or more current pixels from the input coded bitstream;
   if the current coding mode corresponds to the copy-above mode, identifying one or more above pixels located above said one or more current pixels correspondingly; and if said one or more above pixels include one or more current Escape pixels, parsing one or more Escape values from the input coded bitstream for reconstructing said one or more current Escape pixels of said one or more current pixels.

10. The method of claim 9, wherein if the current coding mode corresponds to the copy-above mode, a first number of said one or more current pixels is parsed, derived or inferred.

11. The method of claim 10, wherein if the above pixel located above a leading current pixel of said one or more current pixels is one Escape pixel, the first number of said one or more current pixels is inferred as zero.

12. The method of claim 10, wherein if the current coding mode corresponds to a copy-index mode and a corresponding parsed index is escape index, a second number of said one or more current pixels is parsed, derived or inferred.

13. The method of claim 12, wherein when the second number of said one or more current pixels is parsed, the second number of said one or more current pixels is parsed before one or more Escape values for said one or more current Escape pixels.

14. The method of claim 13, wherein one Escape value for each of color components of each current Escape pixel correspond to the second number of said one or more current pixels is parsed.

15. The method of claim 9, wherein if the current coding mode corresponds to a copy-index mode, an adjusted maximum palette index (AdjustedMaxPaletteIndex) is fixed to be equal to maximum palette index minus 1 (MaxPaletteIndex−1) except for a first sample in the CU.

* * * * *